United States Patent [19]

Angle

[11] 4,010,298
[45] Mar. 1, 1977

[54] UNDERGROUND IRRIGATION DEVICES AND METHODS OF MAKING AND USING THE SAME

[76] Inventor: William M. Angle, Rte. 2, Box 249, Troy, Mo. 63379

[22] Filed: Dec. 3, 1975

[21] Appl. No.: 637,475

[52] U.S. Cl. ............................ 428/36; 29/163.5 F; 29/163.5 R; 72/127; 72/179; 113/116 A; 113/116 UT; 113/116 DD; 138/103; 138/177; 156/196; 156/218; 156/252; 156/304; 264/155; 264/295; 264/296; 264/339

[51] Int. Cl.² ........................................ B29D 23/10

[58] Field of Search ............... 29/163.5 R, 163.5 F; 72/127, 179; 113/116 A, 116 UT, 116 DD; 138/103, 105, 156, 178, 177; 156/196, 200, 218, 252, 304; 264/294, 296, 320, 322, 155, 156, 248, 249, 339; 428/131, 36

[56] References Cited

UNITED STATES PATENTS

| 3,183,571 | 5/1965 | Schmunk et al. | 264/156 |
| 3,864,446 | 2/1975 | Maroschak | 264/156 |

FOREIGN PATENTS OR APPLICATIONS

| 1,091,989 | 11/1967 | United Kingdom | 264/156 |

Primary Examiner—Willard E. Hoag

[57] ABSTRACT

A perforated pipe method of making a perforated pipe suitable for subsurface irrigation laterals by forming indentations and perforations in indentations of sheet material then rolling the sheet material into a tube or pipe.

2 Claims, 7 Drawing Figures

UNDERGROUND IRRIGATION DEVICES AND METHODS OF MAKING AND USING THE SAME

BACKGROUND OF THE INVENTION

Large amounts of poorly used land could be used for productive agricultural purposes if suitable means were provided which yielded economical irrigation of such lands. Systems and devices presently available primarily consist of above ground sprinkler systems, which by their nature are inefficient, expensive and require particular maintenance and protection to avoid deterioration and damage.

SUMMARY OF THE INVENTION

In the present invention a device is contemplated which will provide irrigation in a manner which is simple and economic. It is especially successful in land having a clay base slightly below the surface. The device contemplated herein consists primarily of a main reservoir or source of fluid, a plurality of primary distribution lines coupled to the source and intended to carry fluid to a plurality of secondary distribution lines coupled to each primary distribution line. Each of the secondary distribution lines are provided with anti-clog apertures to allow flow of fluid from such lines to the soil. It is contemplated that the primary and secondary lines are disposed below the surface of the ground.

It is an object of the present invention to provide such a device which will also act as a drainage device and further that it is contemplated that fertilizers and other materials may be fed into the soil via the contemplated device.

It is a primary object of the invention to provide such a device constructed in a fashion which lends itself to economical manufacturing and installation.

With the above primary and other incidental objects in view, which will appear more fully in the specification of the invention which is provided herein, the invention to be protected by Letters Patent consists of the features of construction, the parts and combinations thereof, and the mode of operation hereinafter described or illustrated in the accompanying drawings or their equivalents.

BRIEF DESCRIPTION OF THE DRAWINGS

Referring to the drawings wherein is illustrated a preferred but not necessarily only form of embodiment of the invention.

DETAILED DESCRIPTION OF THE INVENTION

Figure 1:
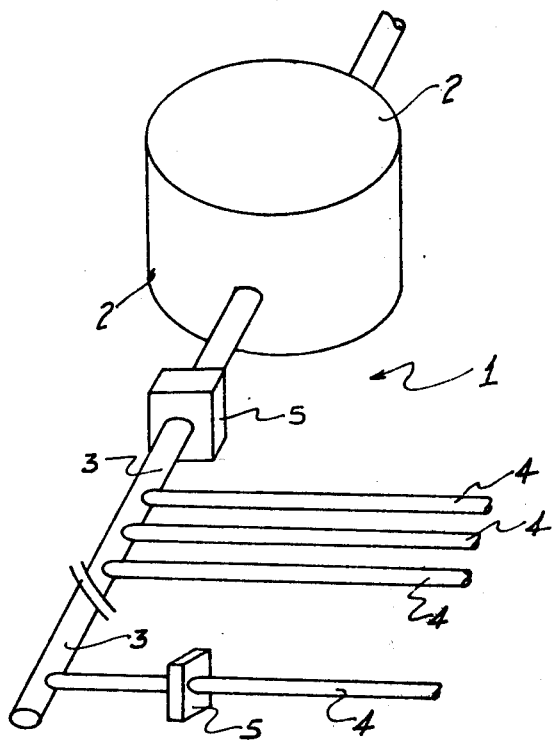
FIG. 1 is a perspective view of an underground irrigation system constructed in accordance with and embodying the present invention.
Figure 2:
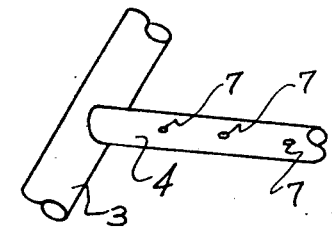
FIG. 2 is an enlarged perspective view of a portion of the device in FIG. 1.
Figure 3:
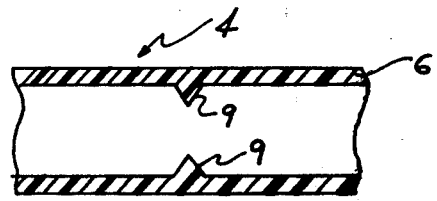
FIG. 3 is a sectional view of a secondary line used in the device in FIG. 1.

Referring now to the drawings in more detail and in particular to FIG. 1, the present invention is an underground irrigation system, which comprises primarily a source, 2, a plurality of primary lines, 3, and secondary lines, 4. Depending upon the particular use, a regulator, 5, may be used.

Figure 7:
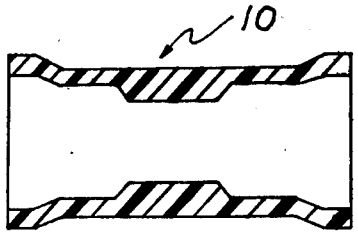
FIG. 7 is an orifice section for use in the device shown in FIG. 1.

In a preferred embodiment of the invention source, 2, may be a pond or pool, provided with pressure adjusting means when necessary, feeding primary lines, 3, which are hollow pipes installed below the surface of the field to be irrigated, usually from 18 inches to 24 inches deep depending upon the soil. Fluid is then fed through the primary lines, 3, to secondary lines, 4, which are also installed below ground level. Secondary lines, 4, shown in greater detail in FIGS. 2, 3, 4 and 5, in a preferred embodiment consist of a pipe or tube approximately one-half (½) inches in outer diameter and a wall, 6, of thickness of approximately one hundredth (0.01) of an inch. It is contemplated that the secondary lines, 4, will be disposed approximately parallel to each other approximately 6 to 11 feet apart. Secondary lines, 4, are provided with apertures, 7, formed in a particular manner. In particular, aperture, 7, is formed by first forming circular indentation, 8, and then punching aperture, 7, outwardly of line, 4. In a preferred embodiment the line, 4, will be fabricated from plastic and when aperture, 7, is punched out a jagged edge will be formed. Depending upon the particular soil, it may be necessary to spread gravel, sand or the like about lines, 4, to prevent clogging of apertures, 7. Further it is desirable to have excess pressure available in the source to periodically fully open apertures, 7. It is contemplated that indentation, 8, will be approximately one-tenth (0.1) inch in diameter and aperture, 7, will be approximately one hundredth (0.01) inch in diameter. It is further contemplated that to increase crush strength of lines, 4, that ridges, 9, will be provided in lines, 4, and further that pressure regulators, 5, or other suitable regulator will be provided in either or both of the lines, 3, and, 4. Further control of the flow in lines, 4, is obtained by inserting orifice sections, 10, in line, 4. These are shown in FIG. 7.

Figure 6:
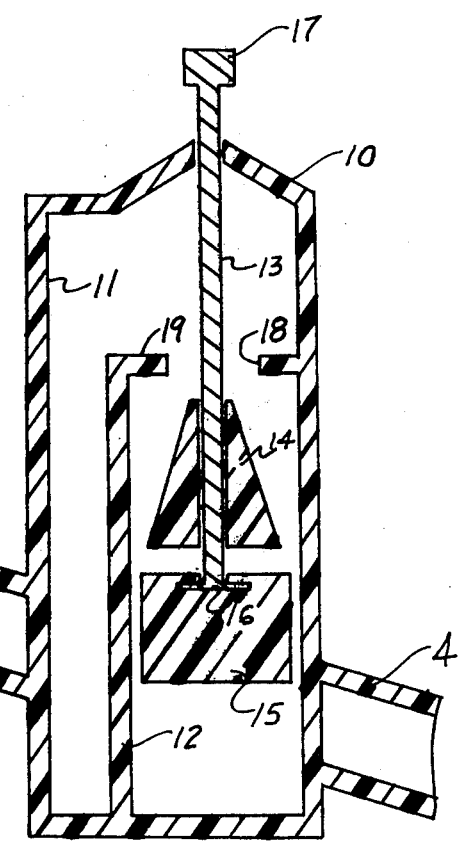
FIG. 6 is a sectional view of a pressure regulator constructed in accordance with and embodying the present invention.
Figure 4:
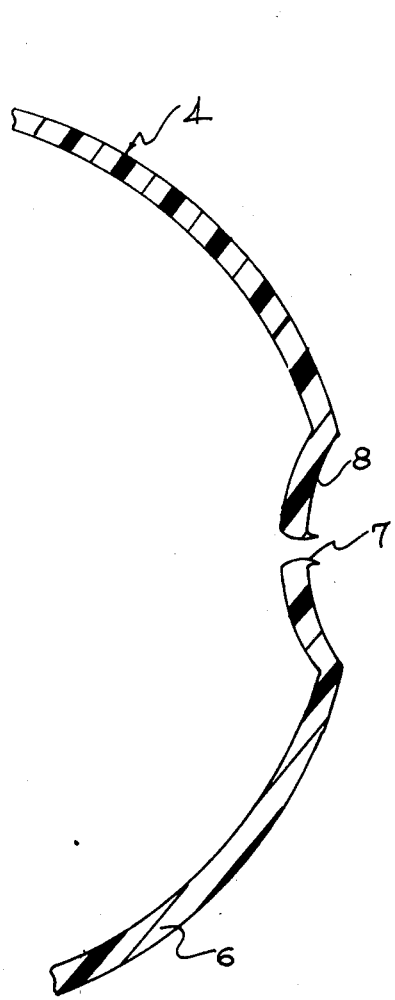
FIG. 4 is another sectional view of a secondary line used in the device in FIG. 1.
Figure 5:
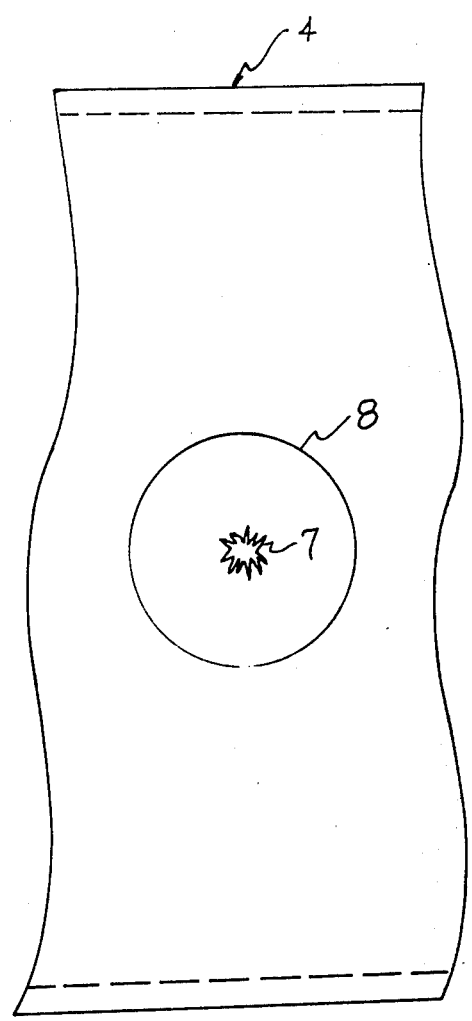
FIG. 5 is another view of the secondary line shown in FIG. 4.

Regulator, 5, is shown in greater detail in FIG. 6 and includes housing, 10, provided with inlet chamber, 11, and outlet chamber, 12. Installed in housing, 10, and extending into chambers, 11, and, 12, is threaded, elongated rod, 13. Rod, 13, is pivotally mounted in housing, 10, and is threadably engaged with conical plug, 14, and pivotally engaged with float, 15. Flange, 16, retains float, 15, in pivotal engagement with rod, 13. It is contemplated in the preferred embodiment that the chamber, 12, be rectangular in cross-section. Float, 15, is shaped in cross section, proximating a rectangle such that it will not rotate more than a few degrees in chamber, 12, but still allow fluid to flow about it, and plug, 14, is provided with a rectangular base (or ears) which prevent its rotation in chamber, 12, by more than a few degrees. The result of this structural configuration is that by turning rod, 13, by means of knob, 17, conical plug, 14, is caused to raise and lower on rod, 13. When fluid is in the system float, 15, is caused to raise or lower depending upon the amount of fluid. When float, 15, is raised by the fluid, rod, 13, and plug, 14, are thereby caused to rise and when plug, 14, is raised sufficiently it closes circular aperture, 18, in wall, 19, which separates chambers, 11, and, 12, and further fluid flow from chamber, 11, into chamber, 12, is cut off.

A further use of the present invention involves its use as a field drainage device. In this application, a collect or line, not shown but essentially the same as primary line, 3, is connected to the lower end of secondary lines, 4, to collect fluid which flows from the soil, into secondary lines and then into the collector line to which a pump or reservoir is attached.

While I have illustrated and described the preferred embodiments of my invention, it is to be understood that changes and modifications in the form, construction, arrangement and combination of the parts and steps of the underground irrigation device and methods of making and using the same may be substituted for those herein shown and described without departing from the nature and principle of my invention.

Having thus described my invention, what I claim as new and desire to secure by U.S. Letters Patent is:

1. In a method of making perforated pipe by steps including rolling perforated flat sheet material into tubular form, the improvement comprising: indenting said flat sheet material to form a depression therein, forming a jagged edge about an aperture within said depression by punching said material from a side opposite said depression and rolling said sheet material into a tube with said depression opening exteriorly of said tube.

2. The product of the method of claim 1.

* * * * *